United States Patent
Sun et al.

(10) Patent No.: US 9,025,707 B1
(45) Date of Patent: *May 5, 2015

(54) DIMENSION REDUCTION FOR CODEBOOK SEARCH

(71) Applicant: Marvell International Ltd., Hamilton (BM)

(72) Inventors: Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,356

(22) Filed: Oct. 11, 2013

Related U.S. Application Data

(63) Continuation of application No. 13/399,553, filed on Feb. 17, 2012, now Pat. No. 8,565,360, which is a continuation of application No. 12/403,112, filed on Mar. 12, 2009, now Pat. No. 8,121,235.

(60) Provisional application No. 61/041,372, filed on Apr. 1, 2008.

(51) Int. Cl.
*H04L 1/02* (2006.01)
*H04B 7/04* (2006.01)

(52) U.S. Cl.
CPC .................................. *H04B 7/0456* (2013.01)

(58) Field of Classification Search
USPC .................. 375/347, 299, 297, 262, 267, 349
See application file for complete search history.

(56) References Cited

U.S. PATENT DOCUMENTS

| | | | |
|---|---|---|---|
| 7,113,556 B1* | 9/2006 | Heegard et al. | 375/346 |
| 8,121,235 B1* | 2/2012 | Sun et al. | 375/347 |
| 8,565,360 B1* | 10/2013 | Sun et al. | 375/347 |
| 2007/0155336 A1* | 7/2007 | Nam et al. | 455/69 |
| 2007/0223622 A1* | 9/2007 | Bang et al. | 375/299 |
| 2007/0280386 A1* | 12/2007 | Waes et al. | 375/347 |
| 2008/0126908 A1* | 5/2008 | Lin | 714/758 |
| 2008/0219373 A1* | 9/2008 | Zhang et al. | 375/262 |

* cited by examiner

*Primary Examiner* — Emmanuel Bayard

(57) ABSTRACT

Systems are provided for searching for a codeword from a plurality of codewords in a codebook for use in precoding, for example, as used in a multiple-input multiple-output (MIMO) transmission system. Dimension reduction techniques may be utilized to reduce the complexity and enhance the efficiency of the codebooks search. Null-spaces of an optimal codeword and codewords in a codebook may be computed. Distance values may be computed based on the null=spaces of the codewords. A codeword may be selected from the codebook based on a minimum distance value from the optimal codeword.

20 Claims, 6 Drawing Sheets

DIMENSION REDUCTION FOR CODEBOOK SEARCH

CROSS-REFERENCE TO RELATED APPLICATIONS

This application is a continuation of U.S. patent application Ser. No. 13/399,553, filed Feb. 17, 2012 (currently pending), which is a continuation of U.S. patent application Ser. No. 12/403,112, filed Mar. 12, 2009 (now U.S. Pat. No. 8,121,235), which claims the benefit under 35 U.S.C. §119 (e) of U.S. Provisional Application No. 61/041,372, filed Apr. 1, 2008, which is are hereby incorporated by reference herein in their entireties.

BACKGROUND OF THE DISCLOSURE

The disclosed technology relates generally to methods and systems for applying dimension reduction techniques to codebook searches, and more particularly to codebook searches in a closed-loop multiple-input multiple-output (MIMO) transmission or storage system.

With the continuing demand for higher-speed digital communications systems and higher-density digital storage systems, various techniques have been applied to increase the efficiency of these systems. For example, closed-loop MIMO precoding may greatly increase spectrum efficiency and improve receiving quality in such systems. These techniques are so effective, that they have been widely adopted in many wireless and communication standards. However, in some cases the increase in spectrum efficiency and receiving quality comes at a cost. In particular, the added step of searching for an "optimal" precoding parameter may deteriorate the performance of such systems; in some case the performance degradation may be quite substantial.

In many cases, the precoding may be implemented using codewords that are derived from predetermined codebooks, which may be defined by a particular standard for communication. These codebooks may range in the number of codeword entries as well as in the size of the entries themselves. In a communications or storage system, a particular codeword is chosen to precode data streams at a transmitter so that the data streams may be effectively received and used by a receiver. During the normal course of operation of the system, conditions may change in the communication channel such that the chosen codeword is no longer the best codeword to use for precoding.

In such a situation, it may become necessary to search the codebook for a codeword that may be better suited for precoding a data stream given the current channel conditions. Because of the size of many codebooks, this search may be quite time and resource intensive. Thus, it becomes difficult to effectively and efficiently search through a codebook for the best codeword.

Accordingly, it is desirable to provide techniques to reduce the complexity and enhance the efficiency of a codebook search.

SUMMARY OF THE DISCLOSURE

Systems for searching for a codeword from a plurality of codewords in a codebook for use in precoding are disclosed that may reduce the complexity and enhance the efficiency of the codebook search. For example, systems are disclosed in which dimension reduction techniques are utilized when computing distances values based on the distances between the optimal codeword and the codewords in the codebook. Such dimension reduction techniques may enhance the efficiency of the codebook search.

One aspect of the invention relates to a system for searching for a codeword from a plurality of codewords in a codebook for use in precoding. In some embodiments, the system may include a memory that may be used to store a codebook with a plurality of codewords and null-spaces of the plurality of codewords. In some embodiments, the system may include a processor that may be capable of determining an optimal codeword based on current channel conditions and determining the null-space of the optimal codeword. In some embodiments, the processor may also be capable of computing distance values based on distances between the null-space of the optimal codeword and the null-spaces of the plurality of codewords. When the processor completes computing distance values, a codeword may be selected from the codebook based on the minimum distance value from the optimal codeword. In some embodiments, the dimensions of the null-spaces of the codewords may be further reduced by removing additional dimensions from the null-spaces of the codewords.

One aspect of the invention relates to a system for searching for a codeword from a plurality of codewords in a codebook for use in precoding that may include a memory capable of storing a codebook with a plurality of codewords and dimension reduced versions of the plurality of codewords. The dimension reduced versions may be reduced by at least one dimension. In some embodiments, the system may include a processor capable of determining an optimal codeword based on channel conditions and reducing at least one dimension of the optimal codeword. In some embodiments, the processor may also be capable of computing distance values based on distances between the dimension reduced optimal codeword and the dimension reduced plurality of codewords. When the processor completes computing distance values, a codeword may be selected from the codebook based on the minimum distance value from the optimal codeword. In some embodiments, the dimensions of the dimension reduced codewords may be further reduced by determining the null-spaces of the dimension reduced codewords.

In some embodiments, the optimal codeword may be determined based characteristics including, signal to noise ratio, mean squared error, mutual information, error rate and/or outage. In some embodiments, the distance values may be computed based on any suitable distance metric, which may include the chordal distance, Fubini-Study distance, and/or projection 2-norm distance.

Further features of the invention, its nature and various advantages will be more apparent from the accompanying drawings and the following detailed description.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

The disclosed invention provides a technique in a closed-loop multiple-input multiple-output data transmission or storage system to perform a search codebook search.

Multiple-input multiple-output (MIMO) systems may be used to improve link reliability and throughput in different environments. For many systems, applying a precoding algorithm at the transmitter may further improve the MIMO system performance by, for example, modifying a data stream based on a precoding value or matrix of values that is optimized for the channel used during transmission. This technique may, for example, increase spectrum efficiency, increase the received signal power, and reduce error rates.

Various types of systems, for example WiMAX, may employ a type of precoding scheme that involves searching through a predetermined codebook for a codeword to use for precoding in the present channel. In some embodiments, the codeword search takes place at a receiver in a communications system. Once the receiver determines a codeword from the codebook, the receiver may communicate this information to a transmitter via a feedback channel. The transmitter may thus employ the newly determined codeword for precoding future transmissions.

Figure 1:
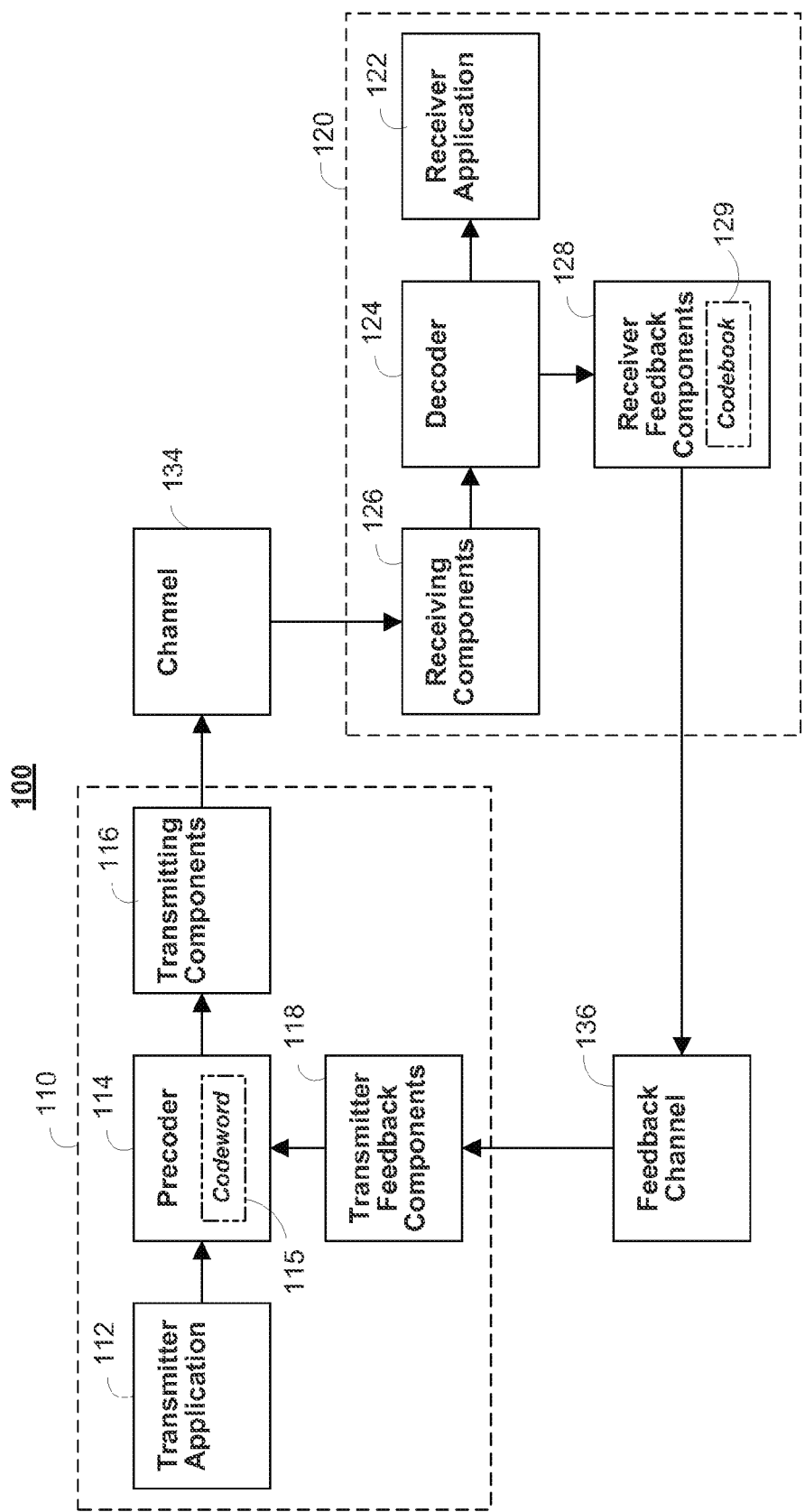
FIG. 1 shows a simplified block diagram of a closed-loop communications or storage system that utilizes precoding techniques.

FIG. 1 shows an illustrative communications system 100 of a basic closed-loop MIMO communications or storage system in accordance with an embodiment of the present invention. System 100 may include transmitter 110 and receiver 120. Transmitter 110 may include transmitter application 112, precoder 114, transmitting components 116, and transmitter feedback components 118. Receiver 120 may include receiver application 122, decoder 124, and receiving components 126, and receiver feedback components 128. Transmitter 110 and receiver 120 may communicate using transmitting components 116 and receiving components 126 respectively across channel 134 and/or feedback channel 136.

Transmitter application 112 and receiver application 122 may be of any type of hardware or software application that produces, uses, and/or receives any type of data. The data may be presented in any suitable form, for example, as a data stream, data symbol, data packet, data bits, data signal, or any other suitable form of data. The data may pertain to audio information, video information, image information, financial information, communications information, or any other type of information that may be represented in digital or analog form.

In some embodiments, transmitter application 112 may produce data that may be passed to and received by precoder 114. Precoder 114 may be capable of performing and applying any type of precoding algorithm to the data received from transmitter application 112, such that the data may be prepared for transmission. For example, precoder 114 may add redundancy codes to the data so that the data may be effectively and/or efficiently transmitted to receiver 120.

Precoder 114 may also include one or more encoders to encode the data to improve transmission efficiency and reduce errors. Such encoders may be capable of encoding the data based on, for example, CRC, LDPC, Turbo, Reed-Solomon, convolutional, or block codes, or any other suitable code. One or more interleavers may also be included in addition to or instead of the encoders. The precoding and/or encoding processing completed at precoder 114 may be performed in hardware and/or software.

In some embodiments, precoder 114 may apply weights to data based on values found in a codeword, for example codeword 115, which may be found by searching through, for example, codebook 129. Codeword 115 may be chosen for use in precoding (among other codewords in codebook 129) because, for example, codeword 115 may satisfy particular objectives. The search through codebook 129 for codeword 115 may be optimized by reducing the dimensions of some the elements involved the searching algorithm. Such embodiments are described in greater detail below.

After the precoding process is completed by precoder 114, the processed data may be passed to transmitting components 116. Transmitting components 116 may be of any suitable form and may be comprised of any suitable components such that it is capable of transmitting the data produced by transmitter application 112 and processed by precoder 114 across channel 134 to receiver 120. For example, transmitting components 116 may include one or more antennas, modulators, encoders, buffers, memory modules, filters, amplifiers or any other suitable component. In some embodiments, wherein there are multiple antennas at transmitter 110, spatial multiplexing may be used to transmit the data. For example, transmitter 110 may separate data into a plurality of different information sequences, such as data streams, and may transmit each stream using a different antenna. The streams themselves may be grouped into data packets and/or symbols. All the components included in transmitting components 116 may perform their functions in software and/or hardware.

After transmitting components 116 complete any pretransmission processes, transmitting components 116 may transmit the data in any suitable form in any suitable transmission or playback medium to receiver 120. This medium is illustrated as channel 134 in FIG. 1. Channel 134 may represent any suitable transmission or storage medium or media. The data traversing channel 134 may be altered by, for example, additive noise. Any suitable form of transmitted data may include, for example, analog or digital version of the data modulated based on any suitable modulation scheme, such as, an Binary Phase-Shift Keying (BPSK) signal, Phase-Shift Keying (PSK) signal, Frequency-Shift Keying (FSK) signal, analog Quadrature Amplitude Modulation (QAM) signal, orthogonal frequency-division multiplexing (OFDM), or any other suitable analog or digital signal. Any suitable transmission or storage media may include, for example, any suitable physical or wireless connection that may be capable of propagating and/or storing data, for example, an electrical or optical data signal. Channel 134 may include one or more channels of varying bandwidth with any suitable center frequency. In some embodiments, the modulated data streams may be transmitted using multiple subcarriers. Therefore, transmitter 110 may output a plurality of spatial signal and/or a plurality of frequency-based signals. For simplicity in describing embodiments of the invention, a transmitter subcarrier output will hereinafter be referred to simply as an output.

After transmitting components 116 transmit the data through channel 134, receiver 120 may receive the data via receiving components 126. Receiving components 126 may include any suitable software and/or hardware necessary to receive the transmitted data and transform the data into a useable format for receiver 120. For example, receiving components 126 may include one or more antennas, demodulators, decoders, buffers, memory modules, filters, amplifiers or any other suitable component. A useable format may include, for example, a digital and/or analog version of the data. In some embodiments, wherein the data is transmitted from transmitter 110 across multiple frequencies and/or subcarriers, receiving components 126 may include any suitable software and/or hardware for substantially determining the transmitted data from the received data.

Once the received data is received and converted into a suitable form, the data may be passed to decoder 124. Decoder 124 may decode the data precoded by precoder 114. For example, decoder 124 may be capable of decoding the redundancy codes produced by precoder 114 to acquire data that is substantially the same as data that was produced by transmitter application 112. For example, decoder 124 may include decoder capable of CRC, LDPC, Turbo, Reed-Solomon, convolutional, or block codes, or any other suitable code. In some embodiments, a codeword, for example codeword 115, that may have been used by precoder 114 to precode data may be known by decoder 124. Decoder 124 may thus utilize the known codeword on the received signal in order to decode the data.

After decoding is completed by decoder 124, decoded data may be passed to receiver application 122. Receiver application 122 may be any type of hardware or software application that produces, uses, and/or receives any type of data or data stream. In some embodiments, the data utilized by receiver application 122 may pertain to substantially the same type of information utilized by transmitter application 112.

In some embodiments, the data from decoder 124 may be passed to receiver feedback components 128 instead of or in addition to receiver application 122. Receiver feedback components 128 may be capable of processing the received data in order to, for example, determine a channel estimate or estimate a channel transfer function representing channel 134 and/or determine characteristics about channel 134. These characteristics may include, for example, signal-to-noise ratio (SNR), noise level, error rate, mean squared error, mutual information, outage, or any other suitable characteristic. In some embodiments, receiver feedback components 128 may utilize the determined channel estimate, estimated channel transfer function, and/or other calculated characteristics to determine any suitable parameter to be used by precoder 114.

In some embodiments, receiver feedback components 128 may include codebook 129. In such embodiments, a suitable codeword, for example codeword 115, may be found to be used by precoder 114 for precoding data in transmitter 110. As mentioned above and described in further detail below, the codeword may be determined by searching through codebook 129 and the search through codebook 129 may be optimized by reducing the dimensions of some the elements involved the searching algorithm. The elements that may be reduced may include, for example, the estimate of the channel transfer function representing channel 134. In such embodiments, once the suitable codeword is determined, information regarding the determined codeword may be communicated to transmitter 110.

It should be noted that the computation and/or utilization of the channel estimate, channel transfer function, and/or channel characteristics may be completed wholly in transmitter 110. In such an embodiment, receiver feedback components 128 may transmit to transmitter 110 information necessary for computing or estimating desired information. For example, receiver feedback components 128 may transmit "raw" data received from channel 134 and communicate the data to transmitter 110 for analysis. In some embodiments, the channel analysis may be split in any suitable manner between transmitter 110 and receiver 120, and the components thereof.

Once a suitable parameter is determined by receiver feedback components 128, the suitable parameter and/or relevant data may be communicated to transmitter 110 via feedback channel 136 and transmitter feedback components 118. Feedback channel 136 may be part of channel 134 or may be an entirely different channel. In some embodiments, the feedback transmission may be completed by utilizing transmitting components 116 and receiving components 126 in lieu of or in addition to transmitter feedback components 118 and receiver feedback components 128. In some embodiments, the communication between transmitter 110 and receiver 120 across feedback channel 136 may be completed by using slower, less efficient, or less accurate means when compared to the communications across channel 134.

When transmitter feedback components 118 receive the parameter information or relevant data from receiver feedback components 128, transmitter 110 may update information in precoder 114 with the received parameter information or information based on the received relevant data so that precoder 114 may process data based on the information received. For example, precoder 114 may initially use codeword $W_1$ (instead of codeword 115) to precode the data before transmission. During the communication process, receiver feedback components 128 may determine that codeword $W_2$ is a codeword better suited for use in precoding, given the conditions of channel 134. Once the determination that codeword $W_2$ is to be used for precoding is made, information regarding this decision may be transmitted by receiver feedback components 128 to transmitter feedback components 118 via feedback channel 136. For example, the codeword $W_2$ or information that allows transmitter 110 to find or calculate codeword $W_2$ may be transmitted to transmitter feedback components 118. Upon receipt by transmitter 110, precoder 114 may be updated with the determined codeword $W_2$, and may begin precoding all subsequent data based on codeword $W_2$.

In order for receiver feedback components 128 or transmitter 110 to determine a suitable parameter for precoding or processing data prior to transmission, a channel estimate or an estimated channel transfer function may first be calculated. Alternatively, the determination of the suitable parameter may be based on a predetermined channel estimate and/or channel transfer function.

Figure 2:
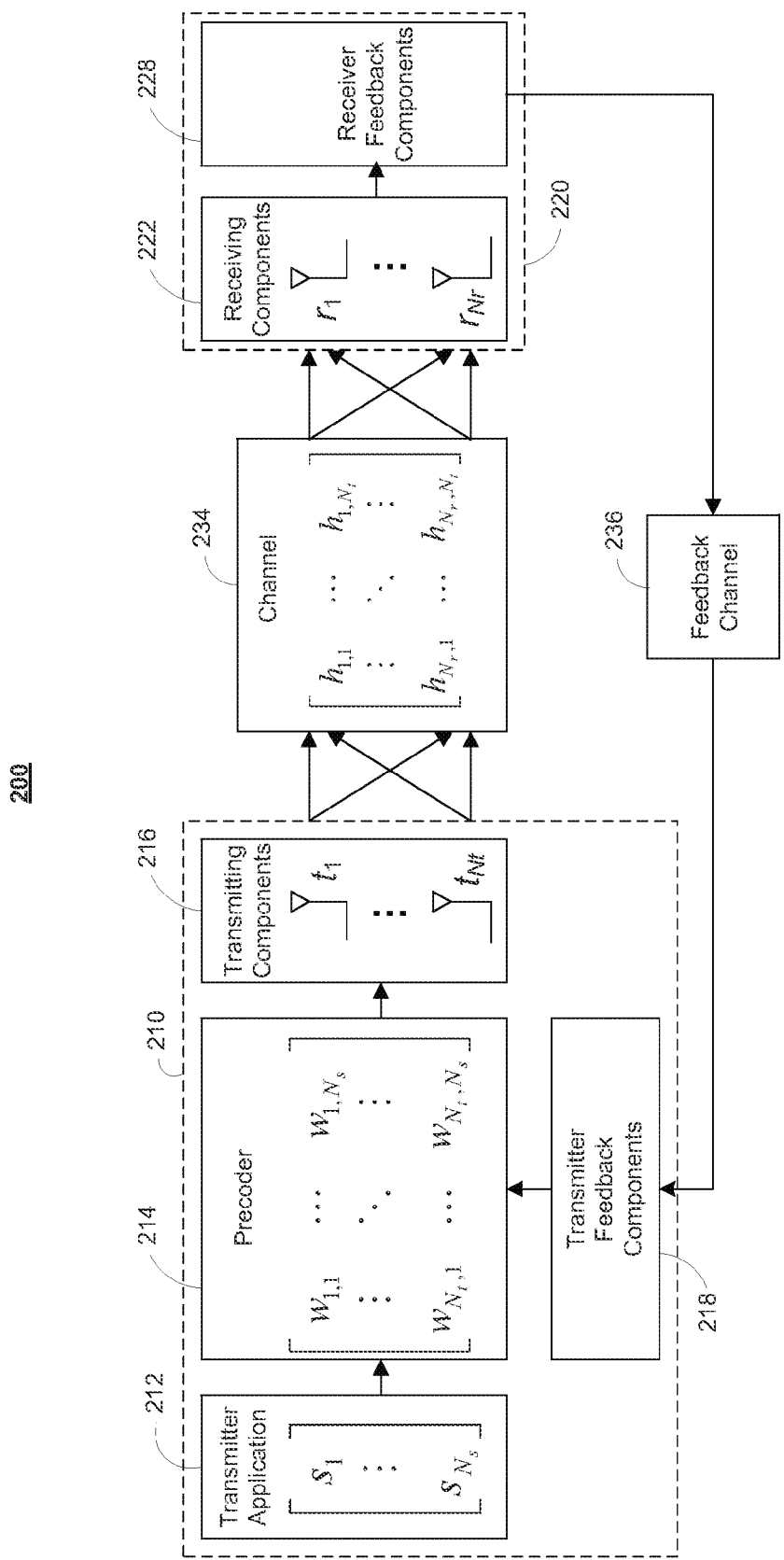
FIG. 2 shows a simplified block diagram of a closed-loop multiple-input, multiple-output (MIMO) system that utilizes precoding techniques.

In some embodiments, system 100 of FIG. 1 may be a closed-loop MIMO system and channel 134 may be a MIMO channel with $N_t$ inputs and $N_r$ outputs, wherein $N_t$ is the number of antennas in transmitter 110 and $N_r$ is the number of antennas in receiver 120. Such an embodiment is illustrated by FIG. 2. System 200 may include transmitter 210 and receiver 220, each of which may be analogous to transmitter 110 and receiver 120 of FIG. 1, respectively. Transmitter 210 may comprise transmitter application 212, precoder 214, transmitting components 216, and transmitter feedback components 218; each analogous to transmitter application 112, precoder 114, transmitting components 116, and transmitter feedback components 118 of FIG. 1, respectively. Receiver 220 may comprise receiving components 226 and receiver feedback components 228; each analogous to receiving components 126 and receiver feedback components 128 of FIG. 1, respectively. System 200 may further comprise feedback channel 236, which may be analogous to feedback channel 136 of FIG. 1, such that receiver 220 may feedback information relevant to precoding to transmitter 210 over feedback channel 236.

In some embodiments, the channel may be represented by channel 234 (which may be analogous to channel 134 of FIG. 1) and the channel transfer function, H, which may be an $N_r \times N_t$ matrix. Due to channel properties, the signal received by each subcarrier input of receiver 220 (e.g., the first subcarrier input on antenna $r_1$) may be based on signals from multiple transmitter antennas (e.g., the first subcarrier output of $t_1, \ldots, t_{Nt}$) of transmitter 210. In particular, the kth subcarrier of the signal received by $r_t$ may be a linear combination of the signals provided by transmitter antennas $t_1, \ldots, t_{Nt}$ for that subcarrier. Thus, in matrix form, system 200 may be modeled by the equations, $$R_k = H_k T_k + G_k, \text{ and} \tag{1}$$

$$\begin{bmatrix} r_1 \\ \vdots \\ r_{N_r} \end{bmatrix}_k = \begin{bmatrix} h_{1,1} & \cdots & h_{1,N_t} \\ \vdots & \ddots & \vdots \\ h_{N_r,1} & \cdots & h_{N_r,N_t} \end{bmatrix}_k \begin{bmatrix} t_1 \\ \vdots \\ t_{N_t} \end{bmatrix}_k + \begin{bmatrix} G_1 \\ \vdots \\ G_{N_r} \end{bmatrix}_k. \tag{2}$$

Here, equation (2) is an expanded version of equation (1), wherein $R_k$ is an $N_r$-dimensional signal vector associated with the kth subcarrier, and where the components of the vector represent the signals received by the $N_r$ inputs of receiver 220. $H_k$ is an $N_r \times N_t$ matrix associated with the kth subcarrier and represents the effect of channel 234 on a transmitted signal vector, and may be referred to as a channel transfer function matrix. The channel transfer function matrix may be predetermined and stored in any suitable memory or may be estimated based on a channel estimation and may be determined during the operation of system 200. In either case, $H_k$ may be stored in receiver 220 and/or transmitter 210 in any suitable storage device, for example, ROM, RAM, or FLASH memory. $T_k$ is an $N_t$-dimensional signal vector representing the $N_t$ spatial data streams transmitted by the NW transmit antennas of transmitter 210 on the kth subcarrier. $G_k$ is an $N_r$-dimensional signal vector representing additive noise on the kth subcarrier received by receiver 220's $N_r$ antennas. While additive noise, represented by $G_k$, may be present in many embodiments of this invention, for simplicity additive noise is assumed to be negligible in the equations that follow, and hence is not represented in FIG. 2. One of ordinary skill in the art would be able to utilize the equations and/or systems described herein when noise is assumed to be non-negligible without departing from the scope of the present invention.

It should be understood that the enumeration of transmitter antennas (e.g., $t_1, \ldots, t_{Nt}$) and receiver antennas (e.g., $r_1, \ldots, r_{Nr}$) are for convenience only, and are not meant to suggest a particular ordering of the antennas. For example, it should not be assumed that the numbering is based on a spatial orientation of the various inputs/outputs, or that the enumeration suggests a relative priority of the various inputs/outputs. The enumeration of transmitter outputs and receiver inputs, similarly, does not necessarily suggest a particular ordering of subcarriers, or a relative priority.

In some embodiments, transmitter 210 may precode one or more data streams, represented by $N_s$ data streams generated by transmitter application 212, as shown in FIG. 2. The $N_s$ data streams may originate in transmitter application 212 and may be precoded using, for example, codewords. In such embodiments, system 200 may be modeled by the equations (assuming noise to be negligible), $$R_k = H_k W_k S_k, \text{ and} \tag{3}$$

$$\begin{bmatrix} r_1 \\ \vdots \\ r_{N_r} \end{bmatrix}_k = \begin{bmatrix} h_{1,1} & \cdots & h_{1,N_t} \\ \vdots & \ddots & \vdots \\ h_{N_r,1} & \cdots & h_{N_r,N_t} \end{bmatrix}_k \begin{bmatrix} w_{1,1} & \cdots & w_{1,N_s} \\ \vdots & \ddots & \vdots \\ w_{N_t,1} & \cdots & w_{N_t,N_s} \end{bmatrix}_k \begin{bmatrix} s_1 \\ \vdots \\ s_{N_s} \end{bmatrix}_k. \tag{4}$$

Here, equation (4) is an expanded version of equation (3), wherein $W_k$ is an $N_t \times N_s$ precoding matrix associated with a codeword and the kth subcarrier. $S_k$ is an N-dimensional signal vector associated with the kth subcarrier and represents the data streams that may originate in transmitter application 212. By applying codeword $W_k$ to data streams $S_k$, codeword $W_k$ may weigh the data streams in $S_k$ on each of transmitting components 216's $N_t$ antennas in order to, for example, improve system performance given the characteristics of channel 234 or optimize performance based on desired objectives. $H_k$ is analogous to $H_k$ of equations (1) and (2).

In some embodiments, codewords $W_1$, $W_2$, $W_k$, or any other codeword may be derived from a given codebook, denoted as F. Codebook F may be predetermined according to a transmission standard or method, for example, adaptive modulation and coding (AMC) in WiMAX frequency division duplexing (FDD), IEEE 802.16m, and long-term evolution (LTE) each involve predefined codebooks. Codebook F may be stored in receiver 220 and/or transmitter 210 in any suitable storage device, for example, ROM, RAM, or FLASH memory. In some embodiments, it may be necessary to search through a defined codebook for a codeword that provides the best performance given an objective, set of objectives and/or channel characteristics. For example, codebook F may be a L-bit codebook which comprises $2^L$ codewords. It may be necessary to exhaustively search through codebook F for a codeword such that an objective, or multiple objectives, are optimized when the codeword is utilized for precoding. Objectives to optimize may include, but are not limited to, post-processing SNR, mean squared error (MSE), mutual information, error rate or outage.

In some embodiments, the codebook search may be complex and time consuming because, for example, the computations utilized in optimizing the objectives may be complex and may have to be separately repeated for all available codewords in a given codebook. Hence, to exhaustively search codebook F, which comprises $2^L$ codewords, at least $2^L$ objective optimizing computations may need to be performed before the "optimal" codeword may be determined. Here, the "optimal" codeword may be any codeword that optimizes a solution given particular conditions and/or objectives. In some embodiments, the "optimal" codeword may be a codeword outside of a given codebook. In such embodiments, it may be desirable to find a codeword from a codebook that provides the "best" approximation of the "optimal" solution. As described in greater detail below, the "best" codeword may be the codeword with the smallest distance to the "optimal" codeword.

In some embodiments, the search for the optimal codeword may be represented by the following equation, $$V_{opt} = \operatorname*{arg\,max}_{W_i \in F\{W_i \ldots W_{2^L}\}} J(HW_i). \quad (5)$$

Here, function $J(\bullet)$ may represent any function or set of functions that optimize for an objective based on the channel transfer function H, and codeword $W_i$, which may be taken from codebook F. $V_{opt}$ is the optimal codeword in codebook F given an objective, channel transfer function H, and codeword $W_i$ taken from codebook F. As shown in equation (5), the optimal codeword may be the codeword $W_i$ that maximizes function $J(\bullet)$. In alternate embodiments, the optimal codeword may be the codeword that minimizes function $J(\bullet)$. If multiple objectives are used to find the optimal codeword, the computation involved in searching for the optimal codeword may become even more complex when compared to the case wherein one objective is to be optimized.

In some embodiments, the optimal codeword may be determined without constraints. For example, the optimal codeword may be found using singular value decomposition (SVD), genetic algorithms, stochastic optimization, heuristic optimization, or neural networks, or any other suitable method. Determining the optimal codeword without constraints may reduce the complexity of the codebook search when compared to the complexity of the objective based optimization described above.

In an embodiment wherein the SVD is utilized, the SVD of the channel transfer function H may be used to find a unitary precoding matrix $V_{opt}$, which may be the optimal precoding matrix. The SVD of the channel transfer function H may be represented by the following equations, $$H = U\lambda V^*_{full}, \text{ and} \quad (6)$$

$$\begin{bmatrix} h_{1,1} & \cdots & h_{1,N_t} \\ \vdots & \ddots & \vdots \\ h_{N_r,1} & \cdots & h_{N_r,N_t} \end{bmatrix} = \quad (7)$$

$$\begin{bmatrix} u_{1,1} & \cdots & u_{1,N_r} \\ \vdots & \ddots & \vdots \\ u_{N_r,1} & \cdots & u_{N_r,N_r} \end{bmatrix} \begin{bmatrix} \lambda_1 & \cdots & 0 \\ \vdots & \ddots & \vdots \\ 0 & \cdots & \lambda_{N_t} \end{bmatrix} \begin{bmatrix} v_{1,1} & \cdots & v_{1,N_t} \\ \vdots & \ddots & \vdots \\ v_{N_t,1} & \cdots & v_{N_t,N_t} \end{bmatrix}.$$

Here, equation (7) is an expanded version of equation (6), wherein U is an $N_r \times N_r$ unitary matrix that contains a set of orthonormal output basis vector directions for H. $V_{full}^*$ is the conjugate transpose of $V_{full}$, which is an $N_t \times N_t$ unitary matrix that contains a set of orthonormal input basis vector directions for H. $\lambda$ is an $N_r \times N_t$ diagonal matrix that contains singular values $\lambda_1$ to $\lambda_{Nt}$, wherein $$\lambda_1 > \lambda_2 > \ldots > \lambda_{Nt}. \quad (8)$$

The columns of $V_{full}$ may be sorted according to the descending singular values, i.e., $V_{full} = [v_1 \ldots v_{Nt}]$. The optimal precoding matrix, $V_{opt}$, may thus be the first $N_s$ columns of $V_{full}$ because the dimensions of $V_{opt}$ are at least partially constrained by the number of data streams, $N_s$, i.e., $$V_{opt} = \begin{bmatrix} v_{1,1} & \cdots & v_{1,N_s} \\ \vdots & \ddots & \vdots \\ v_{N_t,1} & \cdots & v_{N_t,N_s} \end{bmatrix}. \quad (9)$$

With this determined optimal code precoding matrix, $V_{opt}$, it may be possible to find a codeword within codebook F by, for example, determining the codeword with the smallest the distance to $V_{opt}$.

In the case wherein the optimal codeword is found without constraints, distance calculations may be performed in order to determine which of the available codewords is closest to the determined optimal codeword. For example, a codeword in a codebook that has the smallest distance to an optimal codeword may be chosen as the "best" codeword given the channel characteristics. The distance may be calculated using any suitable distance calculation, for example, projection 2-norm distance, represented by the following equation, $$d_{proj} = \|W_i W_i^H - V_{opt} V_{opt}^H\|_2 = \sqrt{1 - \lambda_{min}^2(W_i^H F)}, \quad (10)$$

the Fubini-Study distance, represented by the following equation, $$d_{FS} = \arccos|det(W_i^H V_{opt})|, \quad (11)$$

or the chordal distance, represented by the following equation, $$d_{chor} = \|W_i W_i^H - V_{opt} V_{opt}^H\|_F, \quad (12)$$

or any other suitable distance calculation. In the case of the chordal distance, $\|\bullet\|_F$ is a Frobenius Norm. The chordal distance may be further reduced to the following equation, $$D_{chor} = \sqrt{\operatorname{trace}[(W_i W_i^H - V_{opt} V_{opt}^H)(W_i W_i^H - V_{opt} V_{opt}^H)]}, \quad (13)$$

The operations involved in utilizing any suitable distance metric, such as the distance equations described above, may be complex and may need to be repeated for all codebook entries. Furthermore, under certain conditions, the distance calculations may yield a distance of 0 incorrectly. For example, the chordal distance between any two full-rank unitary matrices equals 0 even if there is some distance between the two matrices. Hence, the distance calculations may not accurately determine the codeword that is closest to the optimal codeword.

Performing a dimensionality reduction may reduce the complexity of the distance computations and the errors that may result in distance calculations that, for example, involve full-rank unitary matrices. In some embodiments, the computational complexity may be reduced by utilizing the null-spaces of the optimal codeword and/or codewords derived from a codebook when computing the distances. For example, the chordal distance between two unitary matrices may equal the chordal distance between their null-spaces. In a simple example, suppose there are two M×N unitary matrices, A and B, wherein M>N, $A^H A = I_N$, and $B^H B = I_N$. Furthermore, suppose that the null-spaces of A and B equal $A_0$ and $B_0$; i.e., Null (A)=$A_0$ and Null(B)=$B_0$, where $A_0$ and $B_0$ are M×(M−N) matrices. Then, $$d_{chor} = \|AA^H - BB^H\|_F = \|A_0 A_0^H - B_0 B_0^H\|_F. \quad (14)$$

This equation may be applied, for example, to the case wherein the chordal distance is to be computed between the optimal codeword and codewords derived from a codebook. It should be noted that the other distance metrics described above, or any other suitable metrics may have a property substantially similar to the property described above.

In some embodiments, the null-space of $V_{opt}$ may be columns $N_s+1$ to $N_t$ of $V_{full}$, in particular if $N_t > N_s$, i.e., $$\text{Null}(V_{opt}) = \begin{bmatrix} v_{1,N_s+1} & \cdots & v_{1,N_t} \\ \vdots & \ddots & \vdots \\ v_{N_t,N_s+1} & \cdots & v_{N_t,N_t} \end{bmatrix}. \quad (15)$$

The null-space of $V_{opt}$ may be determined by any component within a system during the operation of the system. For example, $V_{full}$ may first be determined by receiver feedback components 228 of FIG. 2, then the null-space of $V_{opt}$ may be determined by receiver feedback components 228 of FIG. 2 during the operation of system 200. Alternatively, $V_{opt}$ and the null-space of $V_{opt}$ may be predetermined and stored prior to a system's operation.

The null-spaces of the codewords in a given codebook may be pre-computed and stored prior to operation of a system, for example, system 100 or system 200. Alternatively, the null-spaces of the codewords in a codebook may be determined during the operation of a system.

In some embodiments, wherein the optimal codeword and the codewords from a codebook are unitary, the best codeword from the codebook for use in precoding may be represented by the following equation, $$\text{Codeword}_{opt} = \quad (16)$$
$$\underset{1 \le k \le 2^L}{\arg\min} D_{chor}(V_{opt}, W_k) = \underset{1 \le k \le 2^L}{\arg\min} D_{chor}[\text{Null}(V_{opt}), \text{Null}(W_k)].$$

Here, equation (16) shows that the argument leading to the minimum chordal distance between the optimal codeword and the kth codeword from a codebook is equal to the argument that leads to the minimum chordal distance between the null-space of the optimal codeword and the null-space of the kth codeword from the codebook. This argument may be the best codeword available in the codebook for use in precoding data. It should be noted that the determination of the best codeword completed in this manner is not limited to utilizing the chordal distance. Any suitable distance metric may be used to determine the best codeword for use when precoding in the manner described above.

In some embodiments, the optimal codeword, $V_{opt}$, is guaranteed to be unitary when, for example, $V_{opt}$ is derived from the SVD of the channel transfer function. Furthermore, the codewords in codebooks defined by many transmission standards and methods, for example, WiMAX and LTE, are also unitary. Therefore, equation (16), or any equivalent equation utilizing different distance metrics, may be applicable for use in at least these cases. In some embodiments, where $N_s > N_t/2$, the null-space of $V_{opt}$ and the null-space of $W_k$ are of a lower dimension then $V_{opt}$ and $W_k$. Thus, utilizing the null-spaces of $V_{opt}$ and $W_k$ when computing distance values may require less computation when compared to distance calculations that does not utilize null-spaces. This method may provide a distance value that is exactly the same or substantially the same as a distance value derived from a distance calculation that does not utilize null-spaces.

In some embodiments, in order to reduce the complexity of a codeword search, substantially insignificant and/or arbitrary dimensions may be removed prior to performing distance calculations. Reducing the number of dimensions also may have the advantage of avoiding the singularity problem mentioned above with regards to full-rank matrices in distance calculations. While reducing dimensions may provide a distance value that is an approximate of the real distance value, the approximation may not substantially degrade performance. In some embodiments, the matrices may be sorted such that the largest singular value is in the first column, second largest singular value is in the second column, and so on until the last column, which would contain the smallest singular value.

Removing one or more of the least significant columns prior to performing a distance calculation may not significantly impact performance. For example, a one-dimension reduction may be employed when determining the best codeword based on a suitable distance metric, wherein the last column of the optimal codeword, $V_{opt}$, may be removed. This last column may correspond to the smallest singular value and hence would be the least significant column. Therefore, the best codeword derived from a codebook in this case may be, $$\text{Codeword}_{opt} = \quad (17)$$
$$\underset{1 \le k \le 2^L, \Omega_j = \{1 \cdot N_s\} \setminus \{j\}}{\arg\min} D_{chor}(V_{opt}(:, 1:N_s-1), W_k(:, \Omega_j)),$$

Here, $V_{opt}(:,1:N_s-1)$ represents all rows for columns 1 through $N_s-1$ of the optimal codeword. $W_k(:,\Omega_j)$ represents all rows for columns 1 through $N_s$, except column j of the kth codeword, $W_k$, in a codebook. The best codeword for use in precoding may thus be the argument that leads to the minimum chordal distance between the dimension reduced optimal codeword and the kth dimension reduced codeword from a codebook. It should be noted that the determination of the best codeword completed in this manner is not limited to utilizing the chordal distance. Any suitable distance metric may be used to determine the best codeword for use when precoding in the manner described above. The column or columns removed may be any suitable column such that the resulting distance calculations are of suitable accuracy, i.e., the codeword search performance will not substantially deteriorate as a result of the approximation. In some embodiments, distance calculations may be performed for each of the $2^L$ codewords in a L-bit codebook for at least one value of j within the range 1 to $N_s$.

In cases wherein multiple values of j are utilized for each codeword during the distance calculations, the maximum distance for each codeword may be used to determine the global minimum distance. For example, $N_s$ distance values may be calculated for each of the $2^L$ codewords. Then the maximum distance value may be found between the $N_s$ distance values for each of the $2^L$ codewords. The maximum distance value for each codeword may then be compared to each other to find the global minimum value. The intermediate comparison is not limited to determining the maximum distance value for each codeword. Alternatively, the intermediate comparison may involve finding the minimum, average, or other suitable metric of the distance values. In some embodiments, there may not be an intermediate comparison; in such embodiments all the computed distance values are compared with each other to determine the global minimum distance value.

In some embodiments, the null-space of the dimension reduced optimal codeword and codewords from a codebook as described above may be used to further reduce the complexity of the distance calculations. For example, the dimension of the optimal codeword and all $2^L$ codewords in codebook F may be reduced as described above. The null-space of the dimension reduced codewords may then be computed and used in the distance calculations for the codeword search. As an illustrative example, assume that $V_{full}$ is a full-rank matrix, wherein $N_s=N_t$, then, $V_{opt}=V_{full}$. The dimensionality of $V_{opt}$ may be reduced by one-dimension by removing the last column of $V_{opt}$. The codewords in codebook F may also be reduced by one-dimension by removing one column arbitrarily in codeword $W_k$. The null-space of the two dimension reduced matrices may be the removed columns. In the case where only one column is removed from each matrix, the null-space of the two matrices may be the removed column. Hence, this type of dimensionality reduction yields two vectors that may be used in the distance calculations during the codebook search, thus greatly simplifying the complexity of the search operation. In other cases, where multiple columns are removed, the distance calculation operation may still be greatly simplified. For example, Q columns may be removed, wherein Q may be any integer. Thus, equation (17) may be represented by the following equation, $$\text{Codeword}_{opt} = \underset{1 \leq k \leq 2^L, \Omega_j^{(Q)} = \{1...N_t\} \setminus \Pi_j^{(Q)} \in N^Q \subset \{1...N_t\}}{\arg \min} D_{chor}\left(V_{opt}(:, 1:N_S - Q), W_k\left(:, \Omega_j^{(Q)}\right)\right) \quad (18)$$

$$= \underset{1 \leq k \leq 2^L, \Pi_j^{(Q)} \in N^Q \subset \{1...N_t\}}{\arg \min} D_{chor}\left(V_{opt}(:, N_S - Q + 1:N_S), W_k\left(:, \Pi_j^{(Q)}\right)\right).$$

Here, $\Pi_j^{(Q)}$ represents Q integers chosen from 1 to $N_s$.

In the case where one column is removed from the two matrices, equation (17) may be represented by the following equation, $$\text{Codeword}_{opt} = \underset{1 \leq k \leq 2^L}{\arg \min} D_{chor}(V_{opt}(:, N_S), W_k(:, j)). \quad (19)$$

Using algebraic simplification, the search operation when one column is removed may be represented by the following equation, $$\text{Codeword}_{opt} = \underset{1 \leq k \leq 2^L}{\arg \max} \left\{ \underset{1 \leq j \leq N_t}{\max} |V_{opt}(:, N_t)^H W_k(:, j)| \right\}. \quad (20)$$

Here, the codeword that leads to the maximum of the maximum values derived from the product of the conjugate transpose of the null-space of the optimal codeword and the jth column may be the best codeword for use in precoding. It should be noted that the simplification from equation (19) to equation (20) is not limited to equations based on the chordal distance, but may also apply for each of the distance metrics discussed above, or any other suitable distance metric.

In some embodiments, it may be possible to achieve substantially similar results as the process described above by arbitrarily removing dimensions from the null-spaces of the optimal codeword and the codewords found in the codebook (as opposed to removing dimensions from the relevant codewords before computing the null-spaces). In some embodiments, the null-space of the matrices need not be computed directly because the null-space may simply be the columns of the matrices that are removed, as is the case in the above example. In either case, the dimensionality reductions and/or the null-space determinations may be made prior to or during a system's operation and stored in any suitable memory device.

Figure 3:
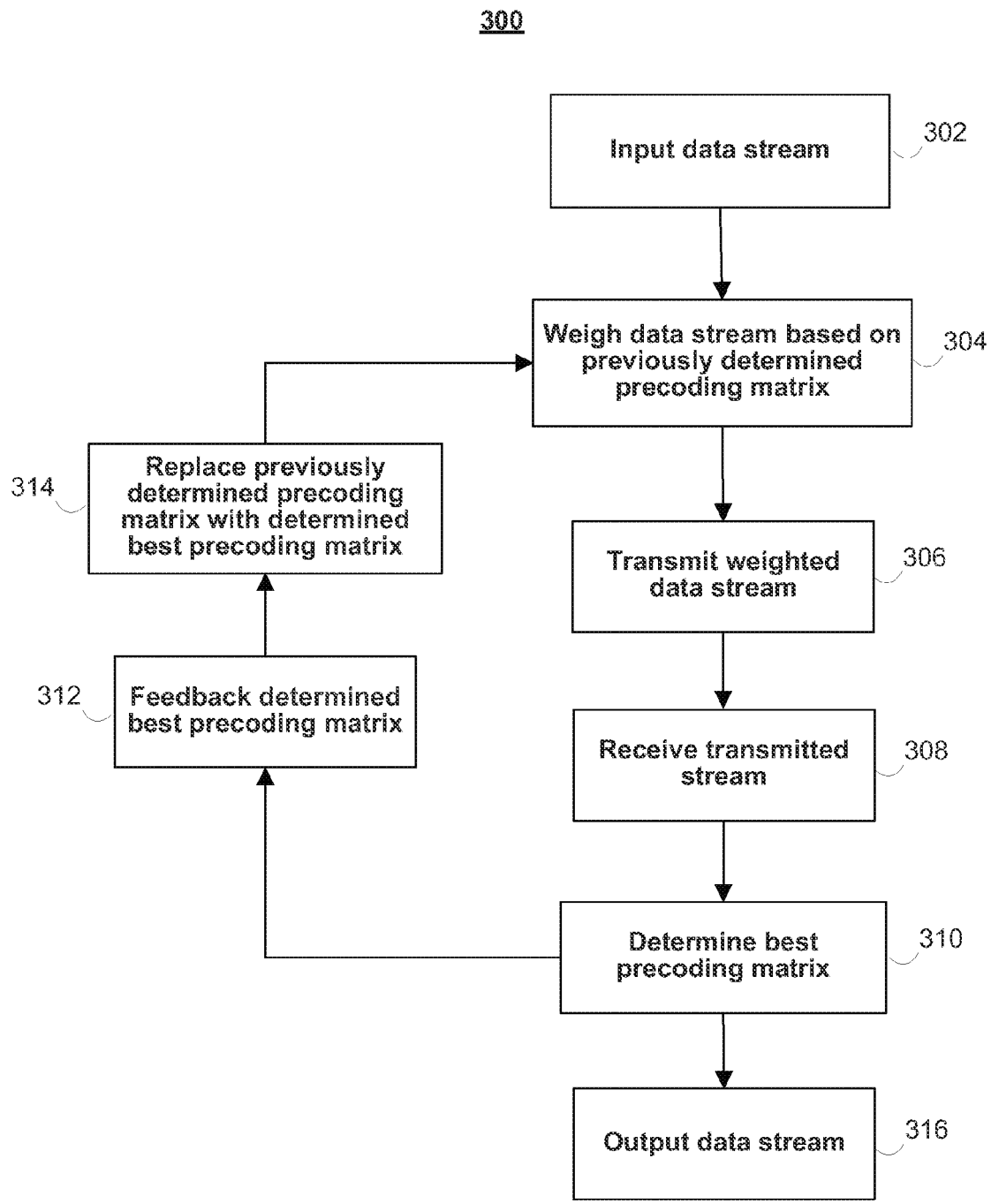
FIG. 3 shows an illustrative flow diagram for determining, updating, and utilizing a chosen precoding matrix in the systems of FIGS. 1 and 2.
Figure 4:
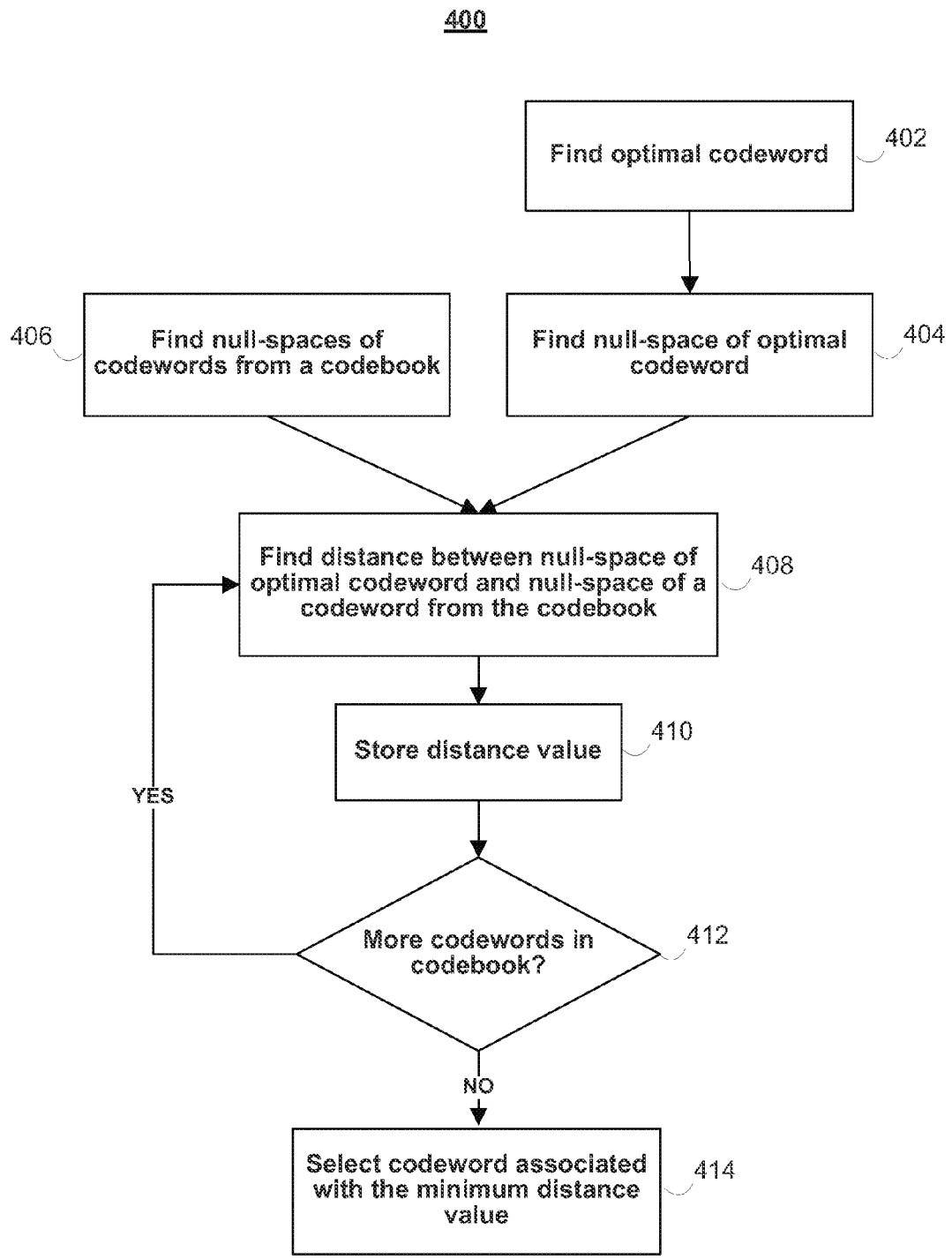
FIG. 4 shows an illustrative flow diagram for a method of searching through a codebook for the best available codeword for use in precoding that utilizes the null-spaces of codewords.
Figure 5:
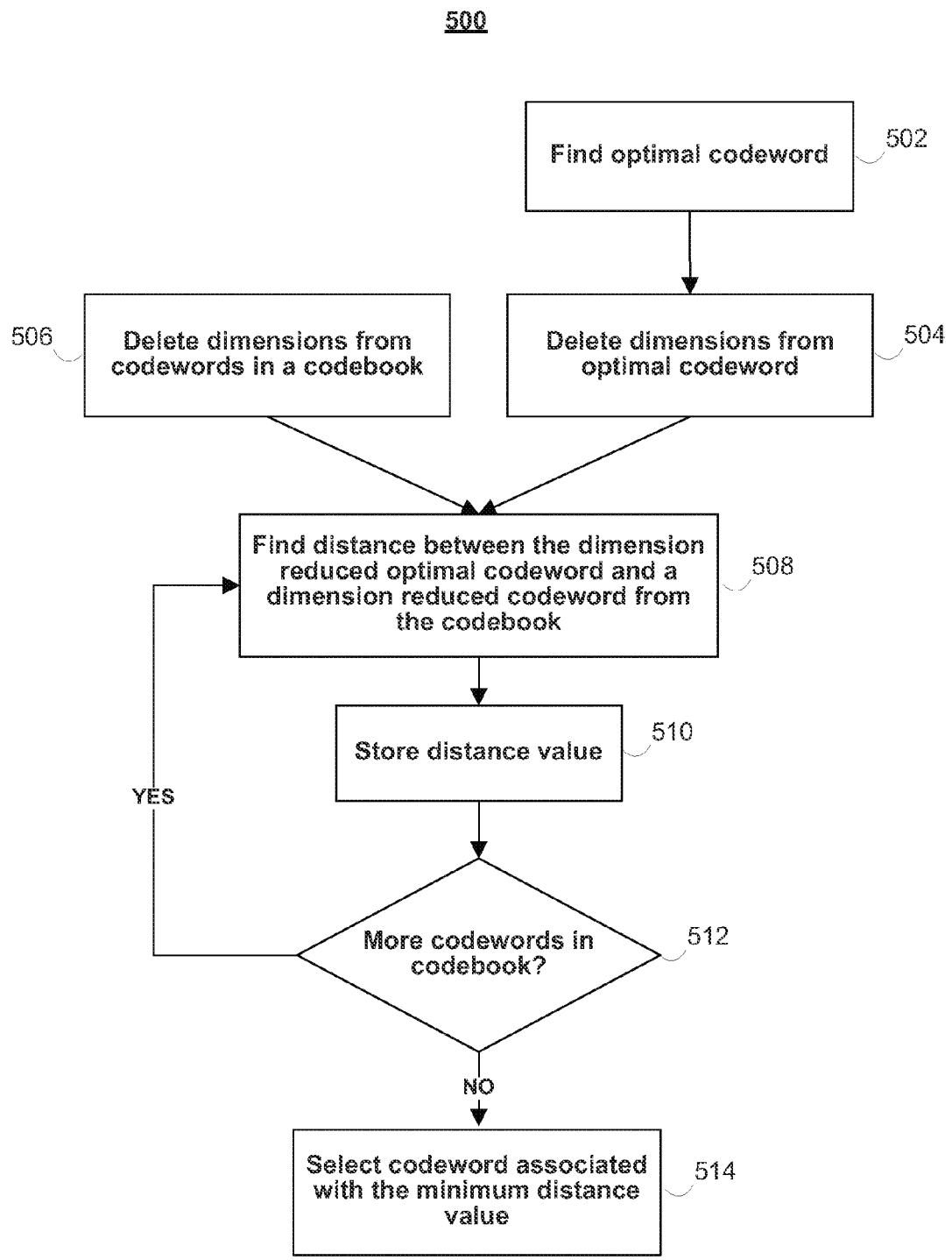
FIG. 5 shows an illustrative flow diagram for a method of searching through a codebook for the best available codeword for use in precoding that deletes dimensions of codewords.

FIGS. 3-5 show illustrative flow diagrams of processes that may be performed in a MIMO system or any suitable communications system, such as system 100 and/or system 200 as described above in connection to FIGS. 1 and 2. It should be understood that any of the following flow diagrams are merely illustrative. Any of the steps illustrated in any of the following flow diagrams may be modified or rearranged, and any additional components may be added, without departing from the scope of the present invention.

Referring now to FIG. 3, illustrative flow diagram 300 is shown for determining, updating, and utilizing a chosen precoding matrix in a system analogous to system 100 and/or system 200 of FIGS. 1 and 2. At step 302, a data stream may be generated and input into a system. The data stream may be generated by a component with any of the properties of transmitter application 112 and/or transmitter application 212 (FIGS. 1 and 2). At step 304, the data streams are weighed according to a particular precoding matrix. The precoding may be completed by a component with any of the properties of precoder 114 and/or precoder 214 (FIGS. 1 and 2). In some embodiments, the precoding matrix may be a codeword derived from a codebook and described above. At step 306, the weighted data stream may be transmitted to a receiver by a transmitter. The transmitter may have any of the properties of transmitter 110 and/or transmitter 210 and the receiver may have any of the properties of receiver 120 and/or receiver 220 (FIGS. 1 and 2). The data streams may be transmitted over a channel which may have any of the properties of channel 134 and/or channel 234 (FIGS. 1 and 2).

At step 308, the receiver may receive the transmitted data stream. The data may be received by any component that may have any of the properties of receiving components 126 and/or receiving components 226 (FIGS. 1 and 2). At step 310, a precoding matrix may be determined. This precoding matrix may be the optimal precoding matrix or the best alternative to the optimal matrix available. As described above, the precoding matrix may be determined based on the characteristics of the channel. Furthermore, the precoding matrix may be a codeword derived from a codebook, which may contain a plurality of codewords. In some embodiments, the codeword may be found by searching through the codebook using any of the techniques described above. Step 310 may take place in either receiver 120 (analogous to receiver 220) or transmitter 110 (analogous to transmitter 210), or combination thereof.

At step 312, the found best precoding matrix may be fed back to the transmitter so that the transmitter may begin precoding the data streams with the best precoding matrix. In some embodiments, information that may lead to the best precoding matrix may be fed back to the transmitter so that the transmitter may determine the best precoding matrix to use, as opposed to the determination being completed by the receiver. As described above, the feedback from the receiver to the transmitter may be done over the same channel that the data streams are transmitted over (i.e., channel 134 and/or channel 234 of FIGS. 1 and 2) or an entirely different channel (i.e., feedback channel 136 and/or feedback channel 236 of FIGS. 1 and 2). At step 314, upon receiving or determining the new best precoding matrix, the existing precoding matrix in the transmitter may be updated with the newly determined best precoding matrix. Thus, future data streams may be precoded based on the newly determined precoding matrix.

In some embodiments, the precoding matrix may be based on a codeword derived from a codebook. In order to determine the best codeword to use given channel characteristics and/or objectives, a search through the codebook may be completed. Referring now to FIG. 4, illustrative flow diagram 400 is shown for a method of searching through a codebook for the best available codeword for use in precoding, wherein the method utilizes the null-spaces of the codewords. At step 402, the optimal codeword, given the channel characteristics and/or objectives to optimize, may be determined. This may be determined, for example as described above, through SVD of the channel transfer function. At step 404, the null-space of the optimal codeword calculated at step 402 may be computed. At step 406, the null-space of the available codewords found in a codebook may be derived. As described above, the derivation of the null-spaces of the codewords may be done prior to a system's operation and stored in memory. In some embodiments, the derivations may be done during a system's operation. At step 408, the distance between the null-space of the optimal codeword and the null-space of an available codeword taken from the codebook may be found. This distance may be derived using any of the distance metrics described above. The distance value calculated in step 408 may be stored at step 410 in any suitable memory device as described above. At step 412, a determination is made whether or not there are still codewords in the codebook whose distance to the optimal codeword has yet to be calculated. If there are more codewords in the codebook that have not been examined, the system returns to step 408 to continue calculating distance values for the remaining codewords in the codebook. If all the distance values have been calculated, then, at step 414, the codeword with the minimum distance value to the optimal codeword is selected for use in precoding.

Referring now to FIG. 5, illustrative flow diagram 500 is shown for a method of searching through a codebook for the best available codeword for use in precoding, wherein the method deletes substantially insignificant or arbitrary dimensions in order to optimize the search. At step 502, the optimal codeword, given the channel characteristics and/or objectives to optimize, may be determined. This may be determined, for example as described above, through SVD of the channel transfer function. At step 504, dimensions of the optimal codeword calculated in step 502 may be deleted. As described above, the dimensions that are deleted may be arbitrary or substantially insignificant, for example, the deleted dimensions may be associated with the smallest singular value. At step 506, dimensions of the available codewords found in a codebook may be deleted. As described above, the derivation of the dimension reduced codewords may be done prior to the system's operation and stored in memory. In some embodiments, the derivation may be done during the system's operation. At step 508, the distance between the dimension reduced optimal codeword and a dimension reduced codeword taken from the codebook may be found. This distance may be derived using any of the distance metrics described above. The distance value calculated in step 508 may be stored at step 510 in any suitable memory device as described above. At step 512, a determination is made whether or not there are still codewords in the codebook whose distance to the optimal codeword has yet to be calculated. If there are more codewords in the codebook that have not been examined, the system returns to step 508 to continue calculating distance values for the remaining codewords in the codebook. If all the distance values have been calculated, then, at step 514, the codeword with the minimum distance value to the optimal codeword is selected for use in precoding.

Figure 6:
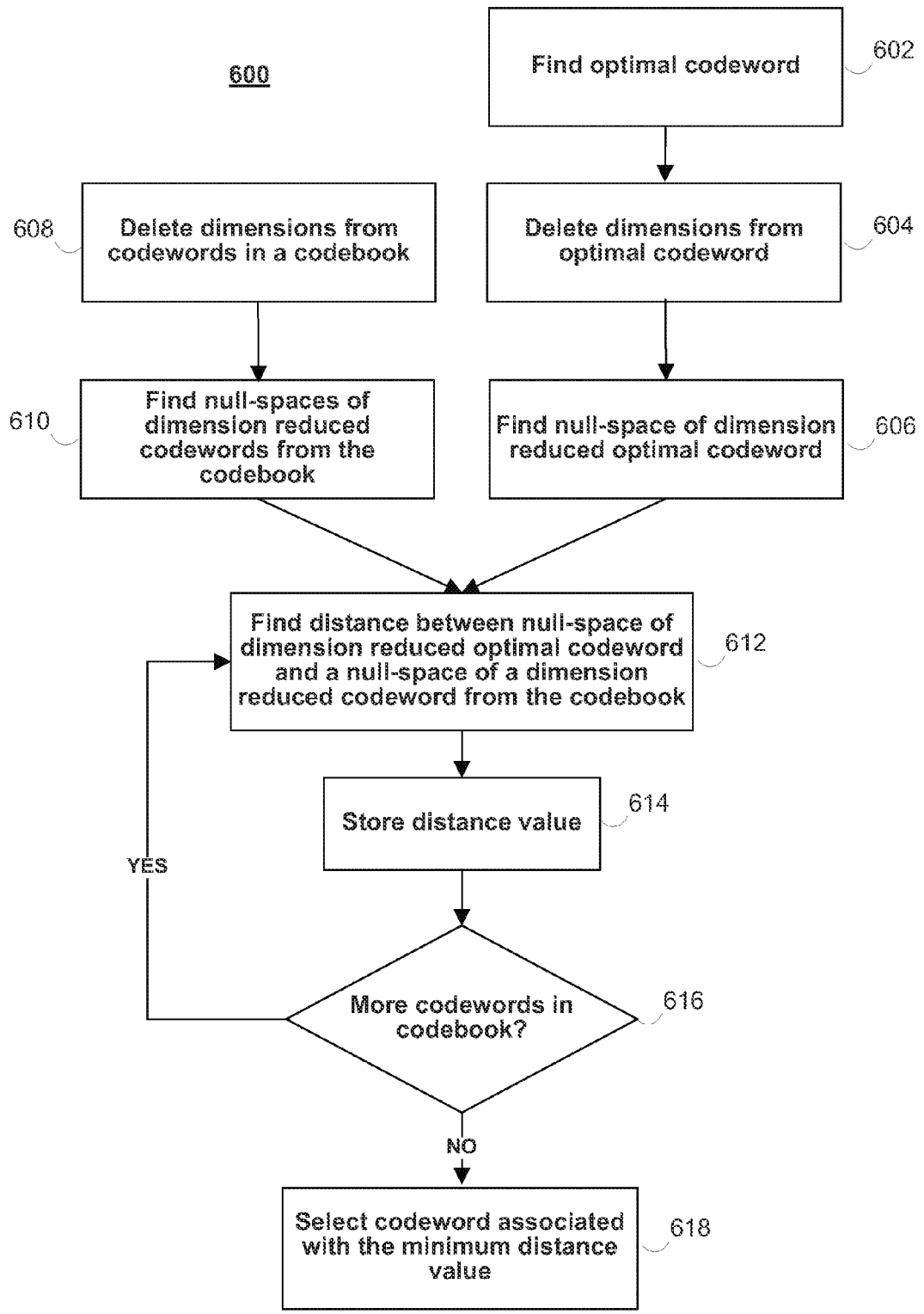
FIG. 6 shows an illustrative flow diagram for a method of searching through a codebook for the best available codeword for use in precoding that deletes dimensions of codewords and takes the null-space of the dimension reduced codewords.

Referring now to FIG. 6, illustrative flow diagram 600 is shown for a method of searching through a codebook for the best available codeword for use in precoding, wherein the method deletes substantially insignificant or arbitrary dimensions of codewords and then takes the null-space of the dimension reduced codewords in order to optimize the search. At step 602, the optimal codeword, given the channel characteristics and/or objectives to optimize, may be determined. This may be determined, for example as described above, through SVD of the channel transfer function. At step 604, dimensions of the optimal codeword calculated in step 602 may be deleted. As described above, the dimensions that are deleted may be arbitrary or substantially insignificant, for example, the deleted dimensions may be associated with the smallest singular value. At step 606, the null-space of the dimension reduced optimal codeword calculated at step 604 may be computed. At step 608, dimensions of the available codewords found in a codebook may be deleted. At step 610, the null-space of the dimension reduced codewords found in a codebook at step 608 may be derived. As described above, the dimension reduction in steps 604 and 608 and the derivation of the null-spaces of the codewords and/or dimension reduced codewords in steps 606 and 610 may be done prior to the system's operation and stored in memory. In some embodiments, the derivations may be done during the system's operation. At step 612, the distance between the null-space of the dimension reduced optimal codeword and the null-space of a dimension reduced codeword taken from the codebook may be found. This distance may be derived using any of the distance metrics described above. The distance value calculated in step 612 may be stored at step 614 in any suitable memory device as described above. At step 616, a determination is made whether or not there are still codewords in the codebook whose distance to the optimal codeword has yet to be calculated. If there are more codewords in the codebook that have not been examined, the system returns to step 612 to continue calculating distance values for the remaining codewords in the codebook. If all the distance values have been calculated, then, at step 618, the codeword with the minimum distance value to the optimal codeword is selected for use in precoding.

The foregoing describes systems and methods for searching a codebook for the best codeword to use in precoding data at a close-loop MIMO transmitter. Those skilled in the art will appreciate that the invention, as relating to dimension reduction, may be applied to any quantization problem of an arbitrary unitary matrix. The application of the invention to a codebook search is presented for the purpose of illustration. For example, the systems and methods to reduce the complexity of quantization problems through dimension reduction, as described herein, may reduce the complexity of quantization problems of unitary matrices as they pertain to image processing, video processing, audio processing, financial processing, signal processing, or any other type of processing. Those skilled in the art will appreciate that the invention may be practiced by other than the described embodiments, which are presented for the purpose of illustration rather than of limitation.

What is claimed is:

1. A non-transitory computer-readable medium storing computer-executable instructions that, when executed by at least one computer processor, causes a computer system to perform a method for searching for a codeword from a plurality of codewords in a codebook for use in precoding, the method comprising:

determining an optimal codeword;
determining a null-space of the optimal codeword;
computing distance values based on distances between the null-space of the optimal codeword and the null-space of each of the plurality of codewords; and
selecting a codeword from the codebook based on a minimum distance value of the distance values.

2. The non-transitory computer-readable medium of claim 1, wherein determining the optimal codeword is further based on a characteristic to optimize.

3. The non-transitory computer-readable medium of claim A, wherein the characteristic to optimize is selected from the group consisting of:
signal to noise ratio,
mean squared error,
mutual information,
error rate, or
outage.

4. The non-transitory computer-readable medium of claim 1, wherein the distance values are computed based on a metric selected from the group consisting of:
chordal distance,
Fubini-Study distance, or
projection 2-norm distance.

5. The non-transitory computer-readable medium of claim 1, further comprising computer-executable instructions for reducing at least one dimension of the null-space of the optimal codeword and the null-space of each of the codewords in the codebook prior to computing the distance values.

6. The non-transitory computer-readable medium of claim 1, wherein the selected codeword is found according to an equation:

$$\text{Codeword}_{opt} = \arg\min_{1 \leq k \leq 2^L} D_{chor}[\text{Null}(V_{opt}), \text{Null}(W_k)],$$

wherein $D_{chor}$ is a chordal distance, $\text{Null}(V_{opt})$ is the null-space of the optimal codeword, $V_{opt}$, and $\text{Null}(W_k)$ is a null-space of a $k^{th}$ codeword in the codebook.

7. A non-transitory computer-readable medium storing computer-executable instructions that, when executed by at least one computer processor, causes a computer system to perform a method for searching for a codeword from a first plurality of codewords in a codebook for use in precoding, the method comprising:
determining a first optimal codeword;
reducing at least one dimension of the first optimal codeword to form a second optimal codeword;
computing distance values based on distances between the second optimal codeword and each of a second plurality of codewords, wherein each codeword within the second plurality of codewords is a dimension reduced version of a codeword within the first plurality of codewords; and
selecting a codeword from the codebook based on a minimum distance value of the distance values to form a selected codeword.

8. The non-transitory computer-readable medium of claim 7, wherein dimensions of the first optimal codeword and dimensions of each of the first plurality of codewords in the codebook are reduced by arbitrarily removing at least one column of the first optimal codeword and at least one column of each of the first plurality of codewords.

9. The non-transitory computer-readable medium of claim 7, wherein determining the first optimal codeword is further based on a characteristic to optimize.

10. The non-transitory computer-readable medium of claim 7, further comprising computer-executable instructions for determining corresponding null-spaces of the second optimal codeword and each of the second plurality of codewords in the codebook prior to computing the distance values.

11. The non-transitory computer-readable medium of claim 10, wherein the null-space of the second optimal codeword is comprised of columns removed from the first optimal codeword to reduce the at least one dimension of the first optimal codeword.

12. The non-transitory computer-readable medium of claim 10, wherein the null-space of each of the second plurality of codewords in the codebook is comprised of columns removed to reduce the at least one dimension of a corresponding codeword within the first plurality of codewords in the codebook.

13. The non-transitory computer-readable medium of claim 7, wherein the selected codeword is found according with an equation:

$$\text{Codeword}_{opt} = \arg\max_{1 \leq k \leq 2^L} \left\{ \max_{1 \leq j \leq N_t} |V_{opt}(:,N_t)^H W_k(:,j)| \right\},$$

wherein L is an integer, $N_t$ is an integer, $V_{opt}$ is the optimal codeword, and $W_k$ is a $k^{th}$ codeword in the codebook.

14. A system for searching for a codeword from a plurality of codewords in a codebook for use in precoding, the system comprising:
an optimal codeword calculator configured to calculate an optimal codeword;
a null-space calculator configured to calculate a null-space of the optimal codeword;
a distance calculator configured to compute distance values based on distances between the null-space of the optimal codeword and the null-space of each of the plurality of codewords; and
a selector configured to select a codeword from the codebook based on a minimum distance value of the distance values.

15. The system of claim 14, further comprising a dimension reducer configured to reduce at least one dimension of the null-space of the optimal codeword and the null-space of each of the codewords in the codebook prior to computing the distance values.

16. A system for searching for a codeword from a first plurality of codewords in a codebook for use in precoding, the system comprising:
an optimal codeword calculator configured to calculate a first optimal codeword;
a dimension reducer configured to reduce at least one dimension of the first optimal codeword to form a second optimal codeword;
a distance calculator configured to compute distance values based on distances between the second optimal codeword and each of a second plurality of codewords, wherein each codeword within the second plurality of codewords is a dimension reduced version of a codeword within the first plurality of codewords; and
a selector configured to select a codeword from the codebook based on a minimum distance value of the distance values to form a selected codeword.

17. The system of claim 16, wherein dimensions of the first optimal codeword and dimensions of each of the first plurality of codewords in the codebook are reduced by arbitrarily removing at least one column of the first optimal codeword and at least one column of the first plurality of codewords.

18. The system of claim 16, further comprising a null-space calculator configured to calculate corresponding null-spaces of the second optimal codeword and each of the second plurality of codewords in the codebook prior to computing the distance values.

19. The system of claim 18, wherein the null-space of the second optimal codeword is comprised of columns removed to reduce the at least one dimension of the first optimal codeword.

20. The system of claim 18, wherein the null-space of each of the second plurality of codewords in the codebook is comprised of columns removed to reduce the at least one dimension of a corresponding codeword within the first plurality of codewords in the codebook.

* * * * *